(12) United States Patent
Hayek et al.

(10) Patent No.: US 12,525,018 B2
(45) Date of Patent: Jan. 13, 2026

(54) METHOD AND APPARATUS FOR MONITORING VERMIN WITHIN A GEOGRAPHIC AREA

(71) Applicant: MOTOROLA SOLUTIONS, INC., Chicago, IL (US)

(72) Inventors: Matthew Hayek, Libertyville, IL (US); Andrew M Davis, Palatine, IL (US); Young Geun Jang, Buffalo Grove, IL (US); Brad A Karch, Geneva, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 95 days.

(21) Appl. No.: 18/525,981

(22) Filed: Dec. 1, 2023

(65) Prior Publication Data

US 2025/0182486 A1 Jun. 5, 2025

(51) Int. Cl.
*G06V 20/52* (2022.01)
*G06V 20/56* (2022.01)

(52) U.S. Cl.
CPC ............. *G06V 20/52* (2022.01); *G06V 20/56* (2022.01)

(58) Field of Classification Search
CPC ........ G06V 20/52; G06V 20/56; G06V 20/53; G06V 20/54; G06V 20/58
USPC .......... 348/152, 61, 143, 144, 153, 154, 155
See application file for complete search history.

(56) References Cited

U.S. PATENT DOCUMENTS

| | | | |
|---|---|---|---|
| 11,160,263 B2 | 11/2021 | Fryers et al. | |
| 11,429,136 B2 | 8/2022 | Taft et al. | |
| 11,721,050 B2 | 8/2023 | Singh et al. | |
| 11,932,242 B1* | 3/2024 | Crego | B60W 30/09 |
| 2014/0207433 A1* | 7/2014 | Chen | G06F 30/20 703/2 |
| 2021/0368762 A1 | 12/2021 | Deering et al. | |
| 2022/0383665 A1* | 12/2022 | Waterman | G07C 5/00 |
| 2024/0153274 A1* | 5/2024 | New | G06T 3/04 |

FOREIGN PATENT DOCUMENTS

WO 2022186806 A1 9/2022

* cited by examiner

*Primary Examiner* — Daquan Zhao

(57) ABSTRACT

A method and apparatus for creating a heat map of vermin within a geographic area is provided herein. During operation a camera (and/or other sensors) that are fixed and/or mobile are utilized to detect vermin. The camera and other sensors themselves may be equipped with the capabilities to detect vermin and report the detection of vermin and their location back to a server, or alternatively, a video feed of the camera and/or other sensors (and their locations) may be provided to the server for the server to attempt to detect vermin. Regardless of how vermin are detected in a particular area (e.g., via a sensor itself performing the detection, or via a server performing the detection via viewing a camera feed), the detected vermin are utilized to create a heat map of vermin for a particular area. The heat map may be provided to health authorities to aid in eradication of vermin.

8 Claims, 4 Drawing Sheets

METHOD AND APPARATUS FOR MONITORING VERMIN WITHIN A GEOGRAPHIC AREA

BACKGROUND OF THE INVENTION

The use of surveillance cameras continues to grow across enterprise and public safety markets. As technology advances, the resolution and detection capabilities of cameras and sensors continue to improve. Cameras and other remote detection capabilities (e.g., LIDAR, which stands for Light Detection and Ranging, that uses light in the form of a pulsed laser to measure ranges (variable distances) to objects) have advanced so much that even the smallest animals, insects, or objects can be detected and identified from long distances. With this in mind, it would be beneficial to use such sensor capabilities to advance public and private health agencies in eradicating dangerous or disease carrying vermin (rats, roaches, mice, . . . , etc.).

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
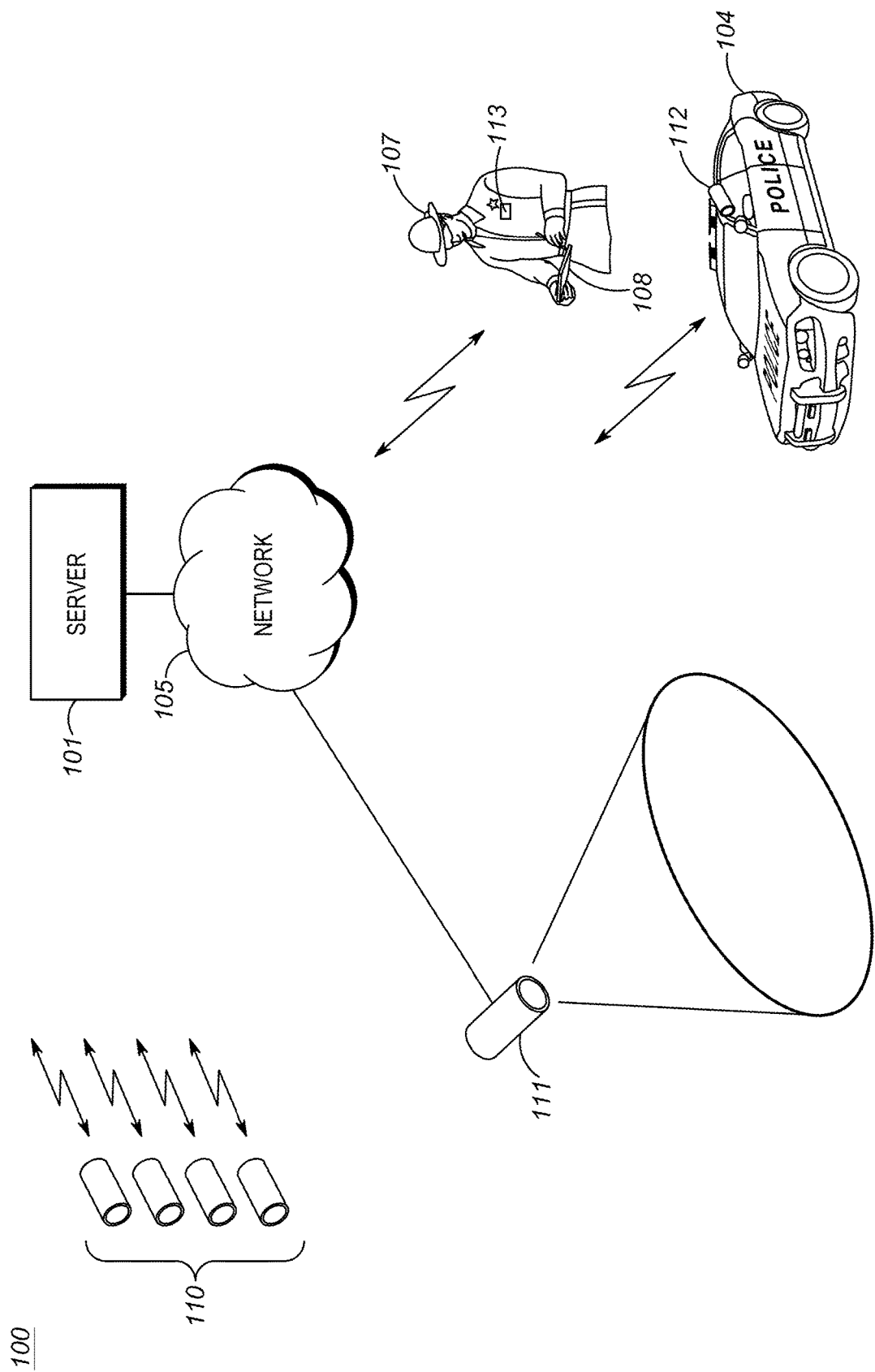
FIG. 1 illustrates a general operating environment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for creating a heat map of vermin within a geographic area is provided herein. During operation a camera (and/or other sensors) that are fixed and/or mobile are utilized to detect vermin. The camera and other sensors themselves may be equipped with the capabilities to detect vermin and report the detection of vermin and their location back to a server, or alternatively, a video feed of the camera and/or other sensors (and their locations) may be provided to the server for the server to attempt to detect vermin. Regardless of how vermin are detected in a particular area (e.g., via a sensor itself performing the detection, or via a server performing the detection via viewing a camera feed), the detected vermin are utilized to create a heat map of vermin for a particular area. The heat map may be provided to health authorities to aid in eradication of vermin.

As used herein, the term "vermin" is meant to encompass any wild animal or insect that is believed to be harmful to crops, humans, farm animals, or game, or that carry disease.

A "heat map" comprises a map differentiating "hot" areas on a map from "cold" areas on the map, usually with varying shades or colors. As described herein, hotter areas are preferably areas that have more vermin activity (i.e., assumed from detected vermin) than colder areas. A hotter area may comprise a geographic area on a heat map having over a predetermined amount of detected vermin within a period of time. For example, a hot area on a heat map may comprise a geographic area having over 50 times where vermin were detected per day, or per time the area was viewed. In a similar manner, a colder area on the heat map may comprise an area having under a predetermined amount of detected activity within a period of time, or each time the area was viewed. For example, a colder area on a heat map may comprise geographic area having under two times where vermin was detected per day. Various numbers of times vermin are detected on average per day may be represented with varying colors or shades on the heat map.

As mentioned above, either sensors themselves may detect vermin and report the vermin back to a server that creates a vermin heat map, or the server itself may view the feeds from the sensors and detect the vermin to create the heat map. Regardless of how the heat map is created either the sensors or the server is equipped with a recognition engine/video analysis engine (VAE) that comprises a software engine that analyzes any video (or sensor information) captured by the cameras. Using the VAE, the entity that is detecting the vermin is capable of "watching" video to detect any vermin (or "watching" a sensor to detect any vermin). It should be noted that artificial intelligence may be utilized as a VAE so that machine learning algorithms use artificial intelligence techniques to identify vermin by being continuously trained and/or previously trained in vermin detection.

Consider the following example: A city has many sensors in place comprising stationary cameras utilized for public safety. In addition, many public-safety officers, taxis, limousines, . . . , etc., roam the city carrying various sensors (cameras, LIDAR, . . . , etc.). For example, security cameras at an airport, restaurant, alley, park, playground, and/or sidewalk, or cameras on a street can be utilized in creating the heat map. In addition, LIDAR data from autonomous taxis may be utilized in creating the heat map. Mobile cameras associated with vehicles that have regular routes, such as patrol cars, body-worn cameras, garbage trucks, mail trucks, . . . , etc. can also be utilized in creating the heat map.

A centralized server may be provided real-time feeds of the sensors along with the sensors locations and attempt to detect vermin within the sensor feeds. The number of vermin detected per time, or per view, in any geographic area (e.g., any 50×50 meter area) is utilized to create a heat map of vermin. This heat map may be output at a display connected to the server, or may be provided as an image to various agencies that may utilize the information in fighting the vermin. As discussed above, the centralized server may be provided real-time information from sensors that detect vermin along with the sensor's locations. The number of vermin detected per time, or per view, in any geographic area (e.g., any 50×50 meter area) is utilized to create a heat map of vermin. This heat map may be output at a display connected to the server, or may be provided as an image to various agencies that may utilize the information in fighting the vermin. A combination of both a server performing vermin detection, and actual sensors performing vermin detection may also take place.

As is evident, the above system adds a feature to camera systems which are currently in place for other reasons, such as security at an airport, restaurant, alley, street, park, playground, and/or sidewalk. With this in mind, monitoring for vermin activity can take place particularly in after-hours when fewer people/passengers/customers are present, such as in empty airport lounges, restaurant eating areas and kitchens, where vermin activity tends to increase. Cameras utilized for vermin detection and creation of a heat map may be attached to a vehicle that travels over regular, repeated routes. Vehicles such as garbage trucks, mail trucks, taxis, limousines, patrol cars, etc. may be utilized. Stationary cameras used in vermin detection and creation of a heat map may be employed as security cameras at an airport, restaurant, alley, street, park, playground, and/or sidewalk, or attached to city light poles. In addition, the server creating the heat map may be located at a public health agency or public-safety dispatch center.

It should be noted that providing information to users of vermin activity does not necessarily need to be accomplished via presenting the user with a heat map of vermin activity. Other forms of maps may be utilized as well. For example, maps that simply place a number of vermin detected over a particular area may be utilized. For example, a map having various numbers over geographic areas may be utilized to indicate vermin activity.

FIG. 1 illustrates a general operating environment 100 for the present invention. As shown, environment 100 is equipped with at least one camera 110, 111, 112, and 113 positioned to capture images/video of objects as they roam through the camera's field of view. In this particular illustration, cameras 110 are wireless security cameras located at various geographic areas that transmit information through network 105 to server 101. Camera 111 comprises a stationary security camera that has a physical connection (e.g., wired) to network 105. Camera 112 comprises a camera located, for example, on police patrol car 104 that wirelessly connects to server 101 via network 105. Finally, camera 113 comprises a police body-worn camera that wirelessly transmits video to server 101 via network 105. As discussed above, other cameras (not shown in FIG. 1) may provide vermin information to server 101 as well.

Server 101 is configured to store any video or images obtained from cameras 110-113, create a vermin heat map, and provide the vermin heat map to a user. In one embodiment of the present invention, server 101 comprises a modified Avigilon™ Control Center (ACC) server. Server 101 may be configured to use various imaging techniques to identify an object, track the object, and determine vermin within any camera's field of view. In order to accomplish this, all cameras are attached (i.e., connected) to server 101 through network 105 via network 105. Example networks include any combination of wired and wireless networks, such as Ethernet, T1, Fiber, USB, IEEE 802.11, 3GPP LTE, and the like. During operation, server 101 receives video feeds from cameras. It should be noted that server 101 may also receive indications of vermin being detected by any camera (sans video feed), along with the camera's location.

Server 101 may create the vermin heat map via determining a number of detected vermin (e.g., rats) within a particular area, within a particular time (e.g., 50 rats detected within a particular area per day). Alternatively, machine learning algorithms using artificial intelligence (AI) techniques can identify patterns of vermin activity from the sensor data to generate the heat maps. Such AI techniques may use unsupervised learning techniques to identify patterns in the data collected by the stationary, mobile, and public safety sensors and generate the heat maps.

FIG. 1 also shows user 107. As shown, user 107 is wearing a body-worn camera 113 that feeds images/video to server 101 along with a location. As shown, user 107 is also in possession of a smart device 108 (e.g., a smart phone, smart tablet, . . . , etc.) that is in communication with server 101 (via network 105). While in communication with server 101, smart device 108 may request a vermin heat map from server 101, and be provided with the vermin heat map via network 105. It should be noted that server 101 may be equipped with a user interface so that a user may be provided with a vermin heat map via the user interface.

Figure 2:
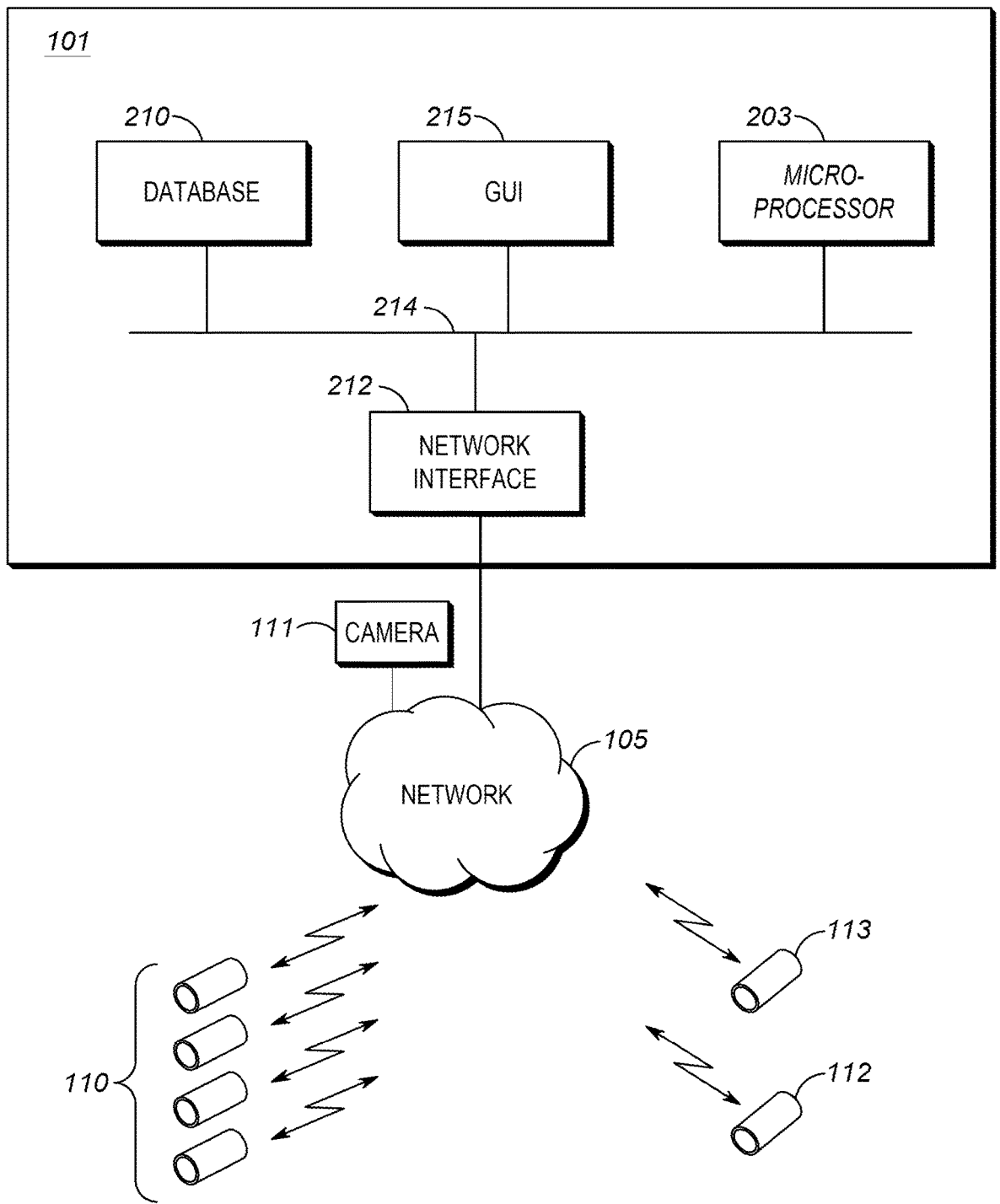
FIG. 2 is a block diagram of the server of FIG. 1.

FIG. 2 illustrates a block diagram of server 101 in accordance with some embodiments. Server 101 may include various components connected by bus 214. Server 101 may include a hardware processor (logic circuitry) 203 such as one or more central processing units (CPUs) or other processing circuitry able to provide any of the functionality described herein when running instructions (e.g., a core of the virtualized processors, a microprocessor, a digital signal processor, a microcontroller, . . . , etc.). Processor 203 may be connected to memory 210 that may include a non-transitory machine-readable medium on which is stored one or more sets of instructions and VAEs executed by processor 203. Memory 210 may include one or more of static or dynamic storage, or removable or non-removable storage, for example. A machine-readable medium may include any medium that is capable of storing, encoding, or carrying instructions for execution by processor 203, such as solid-state memories, magnetic media, and optical media. Machine-readable mediums may include, for example, Electrically Programmable Read-Only Memory (EPROM), Random Access Memory (RAM), or flash memory.

The instructions stored in memory 210 enable server 101 to operate in any manner thus programmed, such as the functionality described specifically herein, when processor 203 executes the instructions. The machine-readable medium may be stored as a single medium or in multiple media, in a centralized or distributed manner. In some embodiments, instructions may further be transmitted or received over a communications network 105 via a network interface 212 utilizing any one of a number of transfer protocols (e.g., frame relay, internet protocol (IP), transmission control protocol (TCP), user datagram protocol (UDP), hypertext transfer protocol (HTTP), etc.).

Network interface 212 may thus enable server 101 to communicate data and send/receive information with other devices (e.g., cameras 110-113 and other sensors not shown) through network 105 via wired or wireless communication. Network interface 212 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which server 101 may be connected via network interface 212 may include a local area network (LAN), a wide area network (WAN), a packet data network (e.g., the Internet), mobile telephone networks (e.g., cellular networks), and wireless data networks.

Cameras 110-113 include circuitry to image its geographic surroundings within the camera's FOV. Camera 102 electronically captures a sequence of video frames (i.e., a sequence of one or more still images) of a FOV, with optional accompanying audio, in a digital format at a particular frame rate. The images or video captured by the image/video cameras may be stored in the storage component 210, or within a camera's internal memory (not shown).

Finally, graphical-user interface (GUI) 215 is provided. GUI 215 provides a man/machine interface for receiving an input from a user (e.g., a request for a vermin heat map) and displaying information. For example, GUI 215 may provide a way of conveying (e.g., displaying) information received from processor 203. Part of this information may comprise a vermin heat map. In order to provide the above features (and additional features), GUI 215 may comprise any combination of a touch screen, a computer screen, a keyboard, or any other interface needed to receive a user input and provide information to the user.

Creating a Heat Map of Vermin Activity

The heat map of vermin activity is created to color or shade various geographic areas differently based on how "active" they are (although other forms of vermin maps may be created as well). As described, for a vermin heat map, a more "active" area comprises an area having more vermin detected over a period of time (or per view), although in alternative embodiments of the present invention, a more "active" area may comprise an area having more of a particular object detected over time (e.g., more rats detected, more roaches detected, more mice detected, . . . , etc.).

In one embodiment of the present invention, logic circuitry 203 receives a video feed from cameras 110-113 and either knows, or is provided with each camera's geographic location. From this information logic circuitry 203 determines geographic areas where vermin is detected. Logic circuitry 203 keeps track of how many times any particular geographic area has detected vermin. For example, one geographic area may detect vermin on average of 100 times a day, while another geographic area may detect vermin only on average of 3 times a day, . . . , etc. This information is stored in memory 210, and a heat map is created based on this information. As discussed above, the vermin detection may be accomplished by any camera 110-113 and logic circuitry 203 may simply be provided with information regarding a detected vermin.

The above process can take place over very short periods (e.g., less than a second so that instantaneous vermin is determined) or over longer periods of time (e.g., days, weeks, months). As discussed above, the heat map may be created by shading the geographic area in such a way that those geographic areas that had many instances of detected vermin are shaded a particular color or gray scale. For example, geographic areas with over 50 instances of detected vermin may be shaded red, while geographic areas between 40 and 50 instances of detected vermin may be shaded orange. Regardless of the color coding/gray scale used, a heat map of "vermin activity" is created by this process. This heat map basically represents the geographic area having shaded areas that indicate geographic areas that have higher and lower histories of detected vermin, and will be a good predictor of future probability of vermin occurring.

In another embodiment of the present invention the heat map may be created by averaging each geographic area's amount of detected vermin over a particular time period. For example, a first geographic area may have an average of 50 instances of detected vermin per day, while a second geographic area may have an average of 10 instances of detected vermin per day. In the creation of the heat map, these two geographic areas may be shaded in different colors.

In yet a further embodiment of the present invention of the present invention in addition to, or instead of a heat map being presented to a user, a warning or notification may be generated and provided to the user when any geographic area has over a predetermined number of vermin detected within a particular period of time. The warning or notification may comprise a text message, email, or any other type of notification. The warning or notification preferably comprises a geographic area. So, for example, a warning such as, "excessive number of rats detected at $5^{th}$ and Main streets" may be generated and sent to various individuals.

With the above in mind, FIG. 2 shows server 101 for monitoring vermin activity, the server comprising network interface 212 coupled to a plurality of sensors (in this case cameras 110-113) deployed for a security purpose and being further provisioned for vermin activity detection.

Processor 203 is provided and configured to receive and analyze data from the sensors and identify vermin, a location of the vermin, and a frequency of detection of the vermin, the processor also configured to generate a heat map of vermin activity based on the analyzed data from the sensors.

Finally, either graphical user interface 215 (for example, located at a public health agency) or network interface 212 is provided for providing a user the heat map.

As discussed above at least one of the sensors may be attached to a vehicle such as a vehicle that travels over regular, repeated routes. Additionally, the vehicle may comprise at least one of a garbage truck, a mail truck, a patrol car, a taxi, or a limousine.

As discussed above, at least one of the sensors may be deployed as security cameras at an airport, restaurant, alley, street, park, playground, and/or sidewalk.

As discussed above, in addition to (or instead of) a heat map being provided to a user, a notification may be provided to the user when vermin activity is above a predetermined threshold. In this situation, FIG. 2 provides for server 101 comprising network interface 212 coupled to a plurality of sensors deployed for a security purpose and being further provisioned for vermin activity detection.

Processor 203 is provided and configured to receive and analyze data from the sensors and identify vermin, a location of the vermin, and a frequency of detection of the vermin, the processor also configured to generate a notification of vermin activity if a frequency of detection of the vermin activity in a geographic area is above a predetermined threshold.

Finally, either a graphical user interface or network interface is provided for providing a user the notification.

Figure 3:
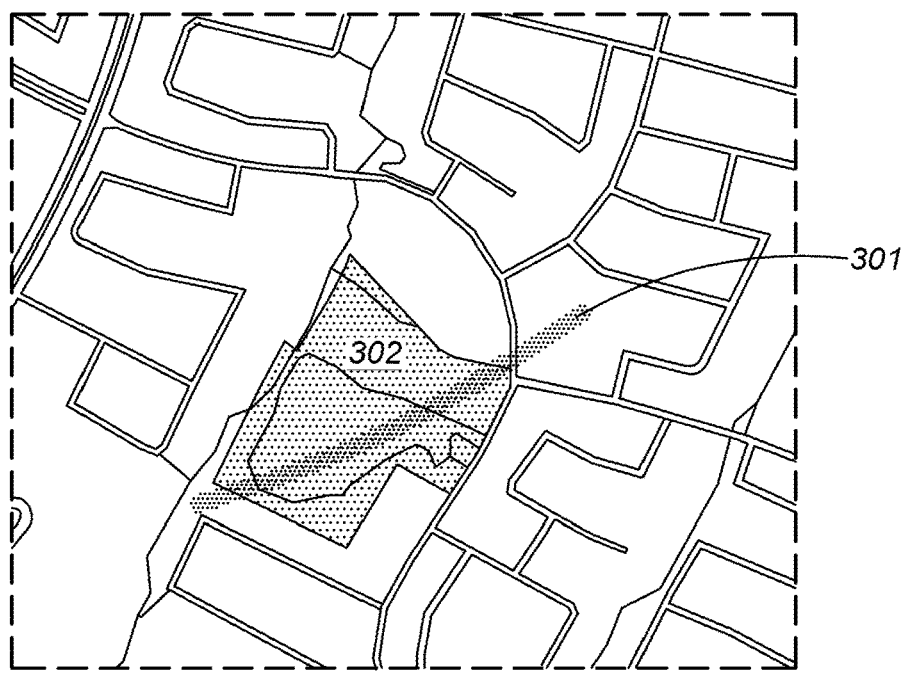
FIG. 3 is an illustration of a heat map.
Figure 4:
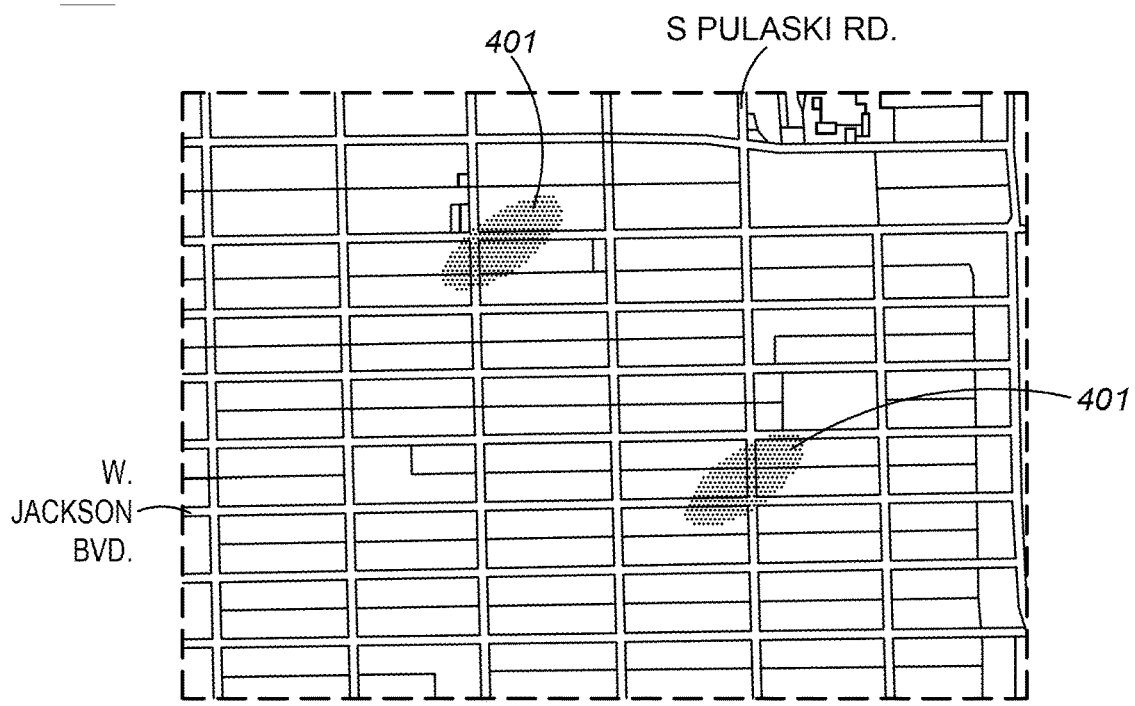
FIG. 4 is an illustration of a heat map.
Figure 5:
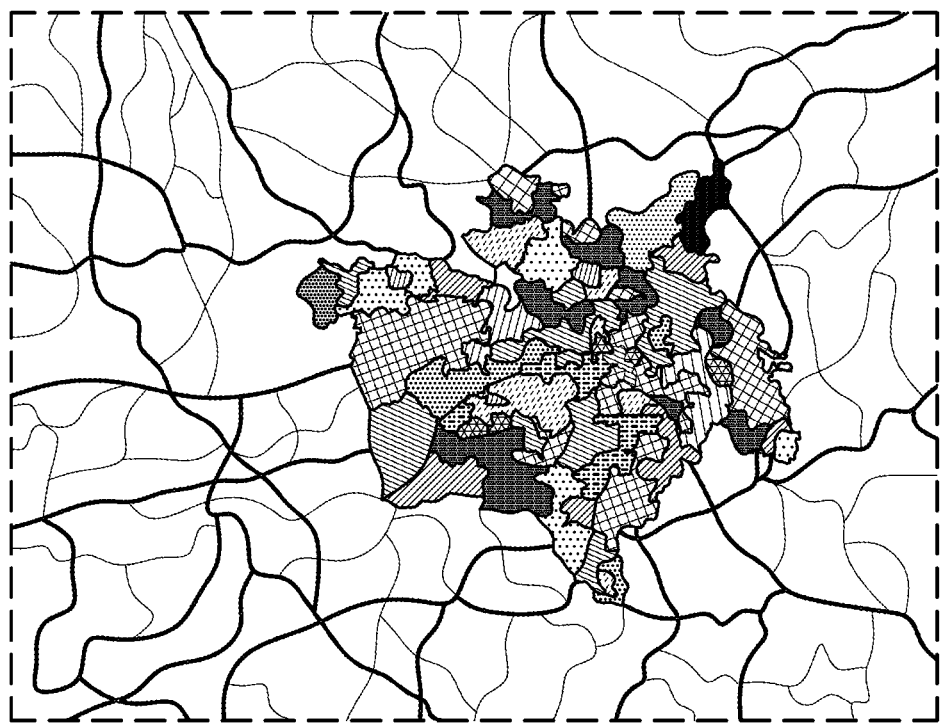
FIG. 5 is an illustration of a heat map.

FIG. 3 through FIG. 5 illustrates example heat maps showing vermin activity. As shown in FIG. 3, vermin heat map 300 shows detected vermin activity in a geographic area shaded in gray. In this example, any detected vermin activity will have an area around the detected activity (e.g., 10×10 meters) shaded in gray. Heat map 300 shows shaded area 301 superimposed over a map. Shaded are 301 indicates that vermin have been detected passing in and out of park 302. In a similar manner, heat map 400 (shown in FIG. 4) shows two areas 401 of detected vermin activity superimposed over a street map.

FIG. 5 shows how different geographic areas (e.g., counties) may be shaded in different colors based on an amount of detected vermin within each county. In this type of heat map, each county will be shaded/colored differently based on an amount of vermin activity detected.

Figure 6:
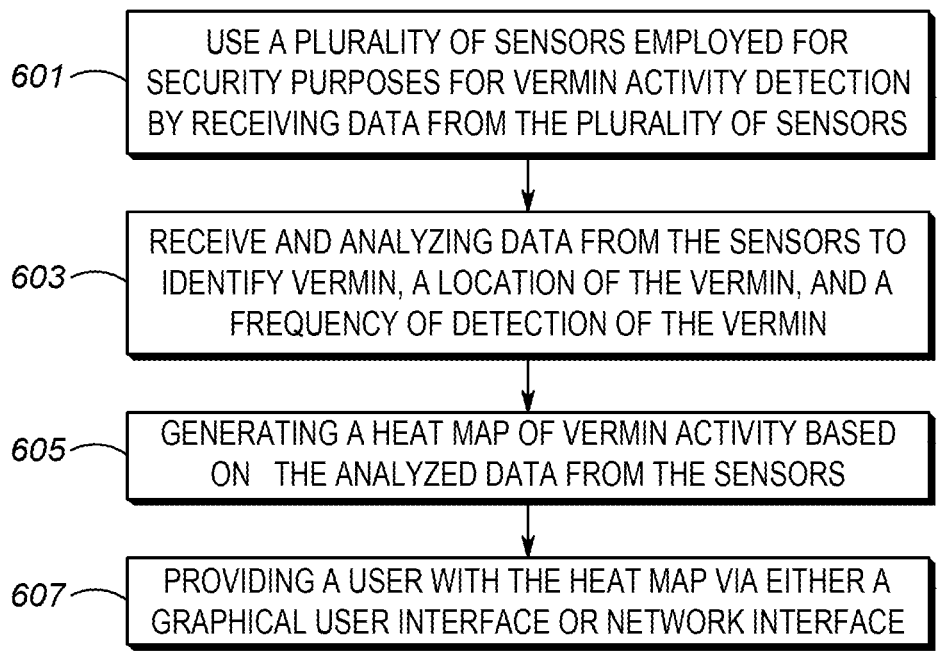
FIG. 6 is a flow chart showing operation of the server of FIG. 2.

FIG. 6 is a flow chart showing operation of server 101. The logic flow begins at step 601 where server 101 uses a plurality of sensors employed for a security purpose for vermin activity detection. More particularly, data (e.g., video or other types of data (e.g., LIDAR data)) is received from the sensors at step 601. At step 603 server 101 analyzes data from the sensors to identify vermin, a location of the vermin, and a frequency of detection of the vermin. The logic flow continues to step 605 where server 101 generates a heat map of vermin activity based on the analyzed data from the sensors. Finally at step 607, server 101 provides a user the heat map via either a graphical user interface or network interface.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server for monitoring vermin activity, the server comprising:
   a network interface coupled to a plurality of mobile vehicular sensors deployed for a security purpose and being further provisioned for vermin activity detection, the vermin selected from one of rats, roaches, mice;
   a processor configured with a video analytics engine (VAE) to receive and analyze data from the mobile vehicular sensors and identify the vermin, a location of the vermin, and a frequency of detection of the vermin, the processor also configured to generate a heat map of vermin activity based on the analyzed data from the sensors; and
   either a graphical user interface or network interface for providing a user the heat map;

wherein the heat map includes geographic areas shaded red having a relatively higher frequency of detection of the vermin and geographic areas shaded orange having a relatively lower frequency of detection of the vermin.

2. The server of claim 1 wherein the vehicle comprises a vehicle that travels over regular, repeated routes.

3. The server of claim 2 wherein the vehicle comprises at least one of a garbage truck, a mail truck, and a patrol car.

4. The server of claim 1 wherein the graphical user interface is located at a public health agency.

5. A method comprising the steps of:
receiving data from a plurality of vehicular sensors employed for a security purpose;
analyzing, by an electronic processor executing a video analytics engine (VAE), data from the sensors to identify vermin, a location of the vermin, and a frequency of detection of the vermin, the vermin selected from one of rats, roaches, mice;
generating, by the electronic processor, a heat map of vermin activity based on the analyzed data from the sensors; and
providing, by the electronic processor, a user the heat map via either a graphical user interface or network interface;
wherein the vehicle comprises a vehicle that travels over regular, repeated routes; and
wherein the heat map includes geographic areas shaded red having a relatively higher frequency of detection of the vermin and geographic areas shaded orange having a relatively lower frequency of detection of the vermin.

6. The method of claim 5 wherein the vehicle comprises at least one of a garbage truck, a mail truck, and a patrol car.

7. A server for monitoring vermin activity, the server comprising:
a network interface coupled to a plurality of mobile vehicular sensors deployed for a security purpose and being further provisioned for vermin activity detection, the vermin selected from one of rats, roaches, mice;
a processor configured with a video analytics engine (VAE) to receive and analyze data from the mobile vehicular sensors and identify the vermin, a location of the vermin, and a frequency of detection of the vermin, the processor also configured to generate a heat map of vermin activity based on the analyzed data from the sensors; and
either a graphical user interface or network interface for providing a user the heat map;
the processor further configured to, responsive to identifying a frequency of detection of the vermin above a predetermined threshold level, electronically transmit a warning or notification to the user indicating the exceeded frequency of detection and the corresponding geographic area.

8. A method comprising the steps of:
receiving data from a plurality of vehicular sensors employed for a security purpose;
analyzing, by an electronic processor executing a video analytics engine (VAE), data from the sensors to identify vermin, a location of the vermin, and a frequency of detection of the vermin, the vermin selected from one of rats, roaches, mice;
generating, by the electronic processor, a heat map of vermin activity based on the analyzed data from the sensors; and
providing, by the electronic processor, a user the heat map via either a graphical user interface or network interface;
wherein the vehicle comprises a vehicle that travels over regular, repeated routes;
further comprising the step of: responsive to identifying a frequency of detection of the vermin above a predetermined threshold level, electronically transmit a warning or notification to the user indicating the exceeded frequency of detection and the corresponding geographic area.

* * * * *